United States Patent [19]
Abadi et al.

[11] Patent Number: 6,079,021
[45] Date of Patent: Jun. 20, 2000

[54] METHOD AND APPARATUS FOR STRENGTHENING PASSWORDS FOR PROTECTION OF COMPUTER SYSTEMS

[75] Inventors: Martin Abadi, Palo Alto, Calif.; Roger Michael Needham, Cambridge; Thomas Mark Angus Lomas, St. Albans, both of United Kingdom

[73] Assignee: Digital Equipment Corporation, Maynard, Mass.

[21] Appl. No.: 08/866,673

[22] Filed: Jun. 2, 1997

[51] Int. Cl.[7] .................................. H04L 9/32; H04L 9/00
[52] U.S. Cl. .......................... 713/202; 380/277; 380/29; 380/30; 380/287; 713/150; 713/151; 713/182; 713/184; 713/189; 713/200; 713/201
[58] Field of Search ..................................... 235/379, 380; 395/186, 187.01, 188.01; 340/825.31, 825.34; 380/4, 9, 21, 23, 24, 25, 46, 49, 50, 59, 255, 277, 29, 30, 287; 713/150–152, 164, 168, 182, 184, 189, 200, 201, 202

[56] References Cited

U.S. PATENT DOCUMENTS

| | | | |
|---|---|---|---|
| 5,204,966 | 4/1993 | Wittenberg et al. | 380/25 X |
| 5,416,841 | 5/1995 | Merrick | 380/29 |
| 5,491,752 | 2/1996 | Kaufman et al. | 380/30 |
| 5,666,415 | 9/1997 | Kaufman | 380/23 |
| 5,719,941 | 2/1998 | Swift et al. | 380/25 |
| 5,751,812 | 5/1998 | Anderson | 380/25 X |
| 5,787,169 | 7/1998 | Eldridge et al. | 380/4 |

OTHER PUBLICATIONS

Manber, U., "A Simple Scheme to Make Passwords Based on One–Way Functions Much Harder to Crack," Dept. of Computer Science, Univ. of Arizona, Nov. 1994.

*Primary Examiner*—Bernarr E. Gregory
*Attorney, Agent, or Firm*—Pennie & Edmonds LLP

[57] ABSTRACT

A computer implemented method provides access to processes and data using strengthened password. During an initialization phase, an access code is stored in a memory of a computer system. The access code is an application of a one-way hash function to a concatenation of a password and a password supplement. The size of the password supplement is a fixed number of bits. During operation of the system, a user enters a password, and the one-way hash function is applied to concatenations of the password and possible values having the size of the password supplement to yield trial access codes. Access is granted when one of the trial access codes is identical to the stored access code.

33 Claims, 1 Drawing Sheet

METHOD AND APPARATUS FOR STRENGTHENING PASSWORDS FOR PROTECTION OF COMPUTER SYSTEMS

FIELD OF THE INVENTION

This invention relates generally to computer systems, and more particularly to strengthened passwords used to protect system processes and data.

BACKGROUND OF THE INVENTION

In computer systems, passwords are the keys that open up access to processes and data. Passwords are also used extensively to gain access to other computerized resources, such as networks, automated teller machines, security systems, devices, services, and the like. Passwords can also be used to encrypt data so that only persons knowing the password can read and modify the data.

Passwords can be implemented with software or hardware. The problem with hardware implemented security keys, such as smart cards, is that they may be lost, stolen, or duplicated. Manufacture, distribution, and maintenance of physical passwords pose additional drawbacks.

Software implemented passwords are also prone to attack. Unless the passwords is fairly long, brute-force search methods can be applied to guess likely passwords. The problem with long passwords is that they are difficult to remember. Therefore, it is desired to provide stronger passwords, without the requirement for the user to remember a long sequence of letters or numbers.

SUMMARY OF THE INVENTION

We provide a high-speed computer implemented method for strengthening passwords. Using extant passwords and a traditional one-way hash function, the difficulty of discovering a password is increased by many orders of magnitude.

During an initialization or set-up phase, an access code is stored in a memory of a computer system. The access code does not need to be kept secret. The access code is an application of a one-way hash function to a concatenation of a correct password and a password supplement. The size of the password supplement is a fixed number of bits, for example twenty bits.

During operation of the system, a user enters a trial password, and the one-way hash function is applied to concatenations of the trial password and possible supplements having, for example, twenty bit values, to yield trial access codes.

Access is granted when one of the trial access codes is identical to the stored access code, otherwise access is denied. If the size of the password supplement is twenty bits, the strength of the password, i.e., the number of possible different values that would have to be tried to discover the password by brute force techniques, is increased about a million fold.

In another aspect of the invention, the password can be used to encrypt and decrypt data. In this application, users can protect data independent of the accesses methods used for the computer used to process the data. Encrypted data is useful in situations where data can be removed from the system using portable storage media such as floppy disks and tape.

DETAILED DESCRIPTION OF PREFERRED EMBODIMENTS

Figure 1:
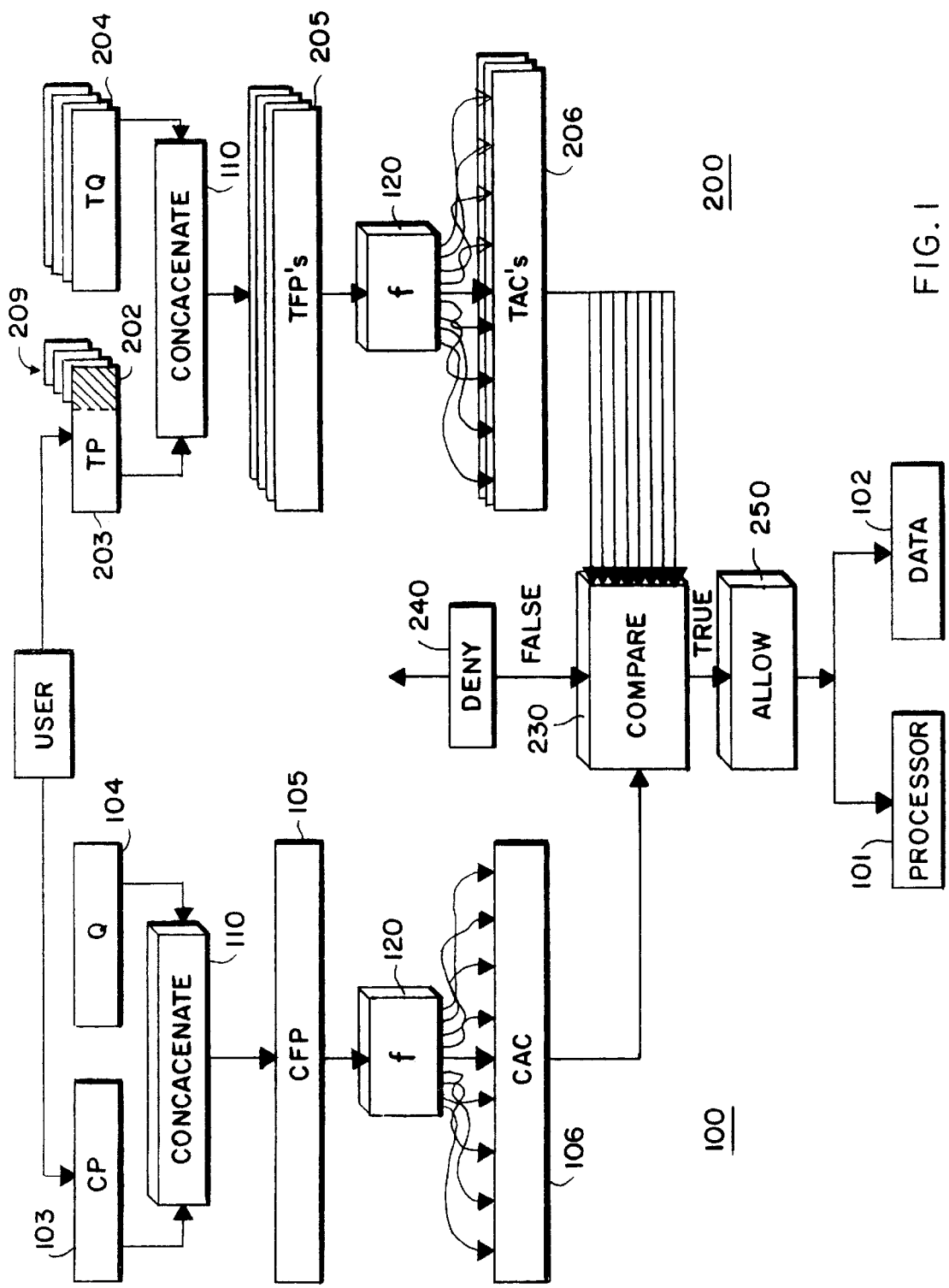
FIG. 1 is a flow diagram of a process for handling strengthened passwords according to a preferred embodiment of the invention.

The embodiments of our invention rely, in part, on a one-way hash function. The follow properties are assumed to hold true for a one-way has function f. For a given value x, f(x) is relatively easy to determine. The computation of f(x) may take a few microseconds, certainly less than a millisecond. The function f is difficult to invert. For a given f(x), it is hard to discover x. In addition, the likelihood of finding collisions in f is small. For a given x and f(x), it is difficult to find a value y that is different than x such that f(x)=f(y). For more information on one-way hash functions please see "Applied Cryptography" by BRUCE SCHNEIER, John Wiley &Sons, 1994.

A preferred embodiment of our invention is described with reference to FIG. 1. In general, a user wishes to have access to computerized resources, for example, processes 101 and data 102 of a computer system. Our method includes two phases. An initialization phase is generally referenced 100 on the left, and an operational phase 200 is shown on the right.

A user conventionally supplies a correct password CP 103, perhaps, since our invention can be used with extant passwords, the user's current password. A computerized process supplies a password supplement Q 104. The value of Q can be, for example, randomly generated. Only its size needs to be known. For example, the supplement is always a twenty bit value. The value of the supplement can change whenever the correct password 103 is changed.

The correct password 103 and its supplement 104 are combined to generate a correct full password (CFP) 105. The combination of the correct password and the supplement can be a concatenation process 110, e.g., CP^Q=CFP. This is simple. Other combinatorial functions which fully use and retain all bits can also be used. At this point, we can discard the supplement. That is, the initialization process 100 can fully consume the supplement. Even the user does not need to know of its fleeting existence.

A one way-hash function 120 is applied to the full password 105 to generate a correct access code 106, e.g., f(CFP)=CAN. The value of the correct access code 106 does not need to be kept secret. That is, the value of CAN 106 can be stored in an untrusted memory, the correct full password 105 is consumed by the hash function 120.

During the operational phase 200, the user, desiring access to resources 101 and 102, supplies a trial password (TP) 203. Our method now attempts the learn the value of the supplement 104 that was combined with the correct password 103 to generate the correct full password 105.

We do this by iteratively trying all possible values which Q 104 might have had, e.g., trial supplements TQ 204 are twenty bit values. Each possible TQ 204 is combined 110, e.g., concatenated, with the trial password 203 to generate trial full passwords (TFPs) 205, e.g, UP^TQ=TFP. The one-way hash function 120 is also used to generate trial access codes (TAC) 206.

The TACs 206 are compared with the stored CAN 206 until a match is detected. If there is no match for any possible TAC 206, then access is denied (240). Otherwise, access to the resources is granted (250). In all cases, this search will take a reasonable amount of time, a few seconds at most.

The protection provided by our method is determined by the strength of the correct full password 105, rather than by the password 103 alone. If the size of the supplement 104 is, for example, twenty bits, then the number of values that would have to be tried to discover the correct full password 105 is roughly a million times larger.

In an alternative embodiment, the user only supplies a partial trial password 203 with part 202 missing. In this case, we search for the remainder by trying possible values 209 for the missing part 202. At this point we can proceed in a similar manner as for a complete trial password 203. This search may take a substantially much longer amount of time, perhaps hours or days, depending how much is missing, This may be acceptable in extreme circumstances, for example, in the case where the full password is forgotten. Thus, the method provides the option of remembering the full password, or a lesser part thereof, and getting a slower response.

As an advantage, the invention can be worked with extant passwords and traditional one-way hash functions. If the size of the password supplement is about twenty bits, then the strength of the password is increased about six orders of magnitude with marginally noticeable delay in response. Effectively, our method provides as much protection as longer passwords without requiring the user to remember or write down a long password, and without requiring any additional hardware.

In another embodiment of the invention, the resource which is protected by the password is data. In this case, the data are encrypted with the correct full password 105 during writing of the data. The data can only be decrypted if correct full password 105 is identical to one of the trial full passwords 205.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention. CLAIMS

We claim:

1. A computer implemented method for accessing a resource, comprising the steps of:

combining a first password with a supplement to generate a full password, wherein the bit length of the supplement is a fixed number of bits and the full password has a larger bit length than the first password;

applying a one-way hash function to the full password to generate an access code stored in a memory of a computer system;

combining a second password with possible supplements to generate trial full passwords, each possible supplement having the fixed number of bits and the trial full passwords each having a larger bit length than the second password;

applying the one-way hash function to the trial full passwords to generate trial access codes; and allowing access to the resource if one of the trial access codes is identical to the stored access code.

2. The method of claim 1, wherein the full password, generated by the first combining step, includes all bits of the first password and the supplement; and each of the full trail passwords, generated by the second combining step, includes all bits of the second passwords and a respective one of the possible supplements.

3. The method of claim 1, further comprising:
   randomly generating a value for the supplement.

4. The method of claim 1, further comprising:
   discarding the supplement after the first combining step; and
   discarding the full password after the first applying step.

5. The method of claim 1, further comprising:
   storing the access code in an untrusted memory.

6. The method of claim 1, wherein the second password is a partial password with a missing part, and further comprising:
   generating a possible missing part for each of the possible supplements.

7. The method of claim 1 further comprising:
   denying access to the resource if none of the trial access codes match the stored access code.

8. A computer implemented method for accessing a resource, comprising the steps of:

combining a first password with a supplement to generate a full password, wherein the supplement has a fixed number of bits;

applying a one-way hash function to the full password to generate an access code stored in a memory of a computer system;

combining a second password with possible supplements to generate trial full passwords, each possible supplement being the fixed number of bits;

applying the one-way hash function to the trial full passwords to generate trial access codes; and allowing access to the resource if one of the trial access codes is identical to the stored access code;

wherein the first combining step includes concatenating the first password and supplement to generate the full password; and the second combining step includes concatenating the second password and the possible supplements to generate the trial full passwords.

9. The method of claim 8, further comprising:
   randomly generating a value for the supplement.

10. The method of claim 8, further comprising:
    discarding the supplement after the first combining step; and
    discarding the full password after the first applying step.

11. The method of claim 8, further comprising:
    storing the access code in an untrusted memory.

12. The method of claim 8 wherein the second password is a partial password with a missing part, and further comprising:
    generating a possible missing part for each of the possible supplements.

13. The method of claim 8, further comprising:
    denying access to the resource if none of the trial access codes match the stored access code.

14. The method of claim 8, wherein the resource is data encrypted with the full password.

15. The method of claim 8, wherein the resource is a computer implemented process.

16. The method of claim 8, wherein the resource is a network.

17. A computer implemented method for accessing a resource, comprising the steps of:

combining a first password with a supplement to generate a full password, wherein the bit length of the supplement is a fixed number of bits and the full password has a larger bit length than the first password;

encrypting data using the full password;

applying a one-way hash function to the full password to generate an access code stored in a memory of a computer system;

combining a second password with possible supplements to generate trial full passwords, each possible supplement having the fixed number of bits and the trial full passwords each having a larger bit length than the second password;

applying the one-way hash function to the trial full passwords to generate trial access codes; and decrypting the data using a particular trial password, the particular trial password yielding a particular trial access code that is identical to the stored access code.

18. A computer program product for use in conjunction with a computer system, the computer program product comprising a computer readable storage medium and a computer program mechanism embedded therein, the computer program mechanism comprising:

a first module for establishing a password, including instructions for:
combining a first password with a supplement to generate a full password, wherein the bit length of the supplement is a fixed number of bits and the full password has a larger bit length than the first password; and
applying a one-way hash function to the full password to generate an access code stored in a memory of a computer system; and a resource access module, including instructions for:
combining a second password with possible supplements to generate trial full passwords, each possible supplement having the fixed number of bits and the trial full passwords each having a larder bit length than the second password;
applying the one-way hash function to the trial full passwords to generate trial access codes; and
allowing access to the resource if one of the trial access codes is identical to the stored access code.

19. The computer program product of claim 18, wherein the first module includes instructions for:
discarding the supplement after combining the first password with the supplement; and
discarding the full password after applying the one-way hash function to the full password.

20. The computer program product of claim 18, wherein
the first module includes instructions for encrypting data using the full password; and
the resource access module includes instructions for decrypting the data using a particular trial password, the particular trial password yielding a particular trial access code that is identical to the stored access code.

21. The computer program of claim 18, wherein
the full password, generated by the first module, includes all bits of the first password and the supplement; and
each of the full trail passwords, generated by the resource access module, includes all bits of the second passwords and a respective one of the possible supplements.

22. The computer program of claim 18, wherein the first module further includes instructions for randomly generating a value for the supplement.

23. The computer program of claim 18, wherein the first module further includes instructions for storing the access code in an untrusted memory.

24. The computer program of claim 18, wherein the second password is a partial password with a missing part, and the resource access module further comprises instructions for generating a possible missing part for each of the possible supplements.

25. The computer program of claim 18, wherein the resource access module further comprises instructions for denying access to the resource if none of the trial access codes match the stored access code.

26. A computer program product for use in conjunction with a computer system, the computer program product comprising a computer readable storage medium and a computer program mechanism embedded therein, the computer program mechanism comprising:

a first module for establishing a password, including instructions for:
combining a first password with a supplement to generate a full password, wherein the size the supplement is a fixed number of bits; and
applying a one-way hash function to the full password to generate an access code stored in a memory of a computer system; and a resource access module, including instructions for:
combining a second password with possible supplements to generate trial full passwords, each possible supplement being the fixed number of bits;
applying the one-way hash function to the trial full passwords to generate trial access codes; and
allowing access to the resource if one of the trial access codes is identical to the stored access code;

wherein the first module includes instructions for concatenating the first password and supplement to generate the full password; and the resource access module includes instructions for concatenating the second password and the possible supplements to generate the trial full passwords.

27. The computer program product of claim 26, wherein the first module includes instructions for:
discarding the supplement after combining the first password with the supplement; and
discarding the full password after applying the one-way hash function to the full password.

28. The computer program product of claim 26,
wherein
the first module includes instructions for encrypting data using the full password; and
the resource access module includes instructions for decrypting the data using a particular trial password, the particular trial password yielding a particular trial access code that is identical to the stored access code.

29. The computer program of claim 26, wherein
the full password, generated by the first module, includes all bits of the first password and the supplement; and
each of the full trail passwords, generated by the resource access module, includes all bits of the second passwords and a respective one of the possible supplements.

30. The computer program of claim 26, wherein the first module further includes instructions for randomly generating a value for the supplement.

31. The computer program of claim 26, wherein the first module further includes instructions for storing the access code in an untrusted memory.

32. The computer program of claim 26, wherein the second password is a partial password with a missing part, and the resource access module further comprises instructions for generating a possible missing part for each of the possible supplements.

33. The computer program of claim 26, wherein the resource access module further comprises instructions for denying access to the resource if none of the trial access codes match the stored access code.

* * * * *

UNITED STATES PATENT AND TRADEMARK OFFICE
CERTIFICATE OF CORRECTION

PATENT NO.    : 6,079,021
DATED         : June 20, 2000
INVENTOR(S)   : Martin Abadi et al.

It is certified that error appears in the above-identified patent and that said Letters Patent is hereby corrected as shown below:

Column 5,
Line 28, delete "larder" and insert therefor -- larger --

Column 6,
Line 48, delete "trail" and insert therefor -- trial --

Signed and Sealed this

Thirty-first Day of May, 2005

JON W. DUDAS
*Director of the United States Patent and Trademark Office*